R. S. HOYT.
ARTIFICIAL LINE.
APPLICATION FILED APR. 30, 1913.

1,124,904.

Patented Jan. 12, 1915.

2 SHEETS—SHEET 1.

$$\frac{\sqrt{1-w^2}}{1-4x(1-x)w^2}$$

Witnesses.
James E. Lynch
Joseph A. Gately

Inventor
Ray S. Hoyt,
By Thomas Lockwood
Atty

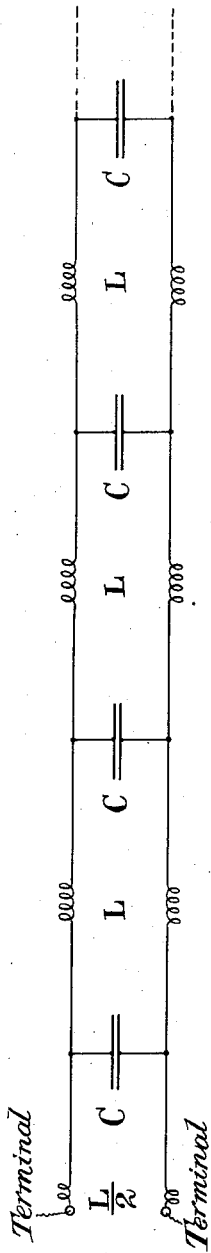
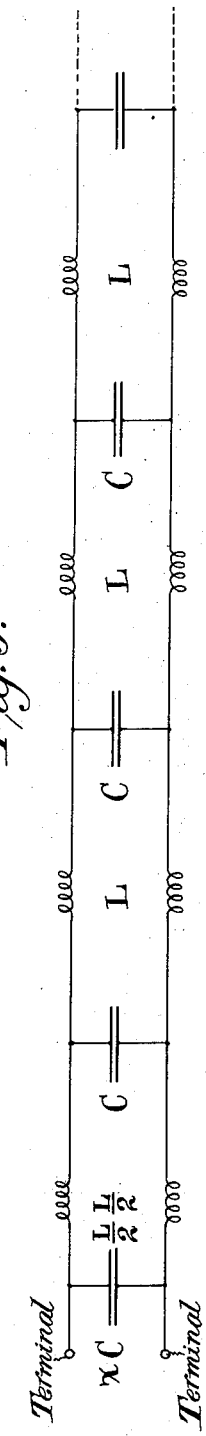

UNITED STATES PATENT OFFICE.

RAY S. HOYT, OF BROOKLYN, NEW YORK, ASSIGNOR TO AMERICAN TELEPHONE AND TELEGRAPH COMPANY, A CORPORATION OF NEW YORK.

ARTIFICIAL LINE.

1,124,904.  Specification of Letters Patent.  Patented Jan. 12, 1915.

Application filed April 30, 1913. Serial No. 764,626.

*To all whom it may concern:*

Be it known that I, RAY S. HOYT, residing at Brooklyn, in the county of Kings and State of New York, have invented certain Improvements in Artificial Lines, of which the following is a specification.

The impedance of a long periodically loaded transmission line depends on the position of the initial end with regard to the first loading point and the frequency of the current transmitted. This impedance may, of course, be simulated as closely as desired by constructing an artificial model of the given loaded line, section by section, but this is expensive and heretofore it has not been known how to proportion any simple network to have the requisite impedance variation with frequency. Because of the large number and wide range of the variables involved, a purely experimental or empirical attempt at proportioning a simple network to fulfil the severe requirements is impracticable. My invention provides a simple three-branch network, which simulates very closely over a wide frequency range the impedance of a long periodically loaded transmission line which begins at a particular distance from the first loading point. This accomplished, only a slight extension is required to supplement this network so as to simulate the impedance of a long periodically loaded line beginning at any point in a periodic interval.

Figure 1:
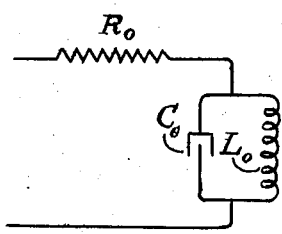
Figure 2:
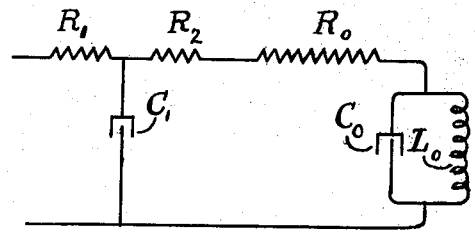
Figure 3:
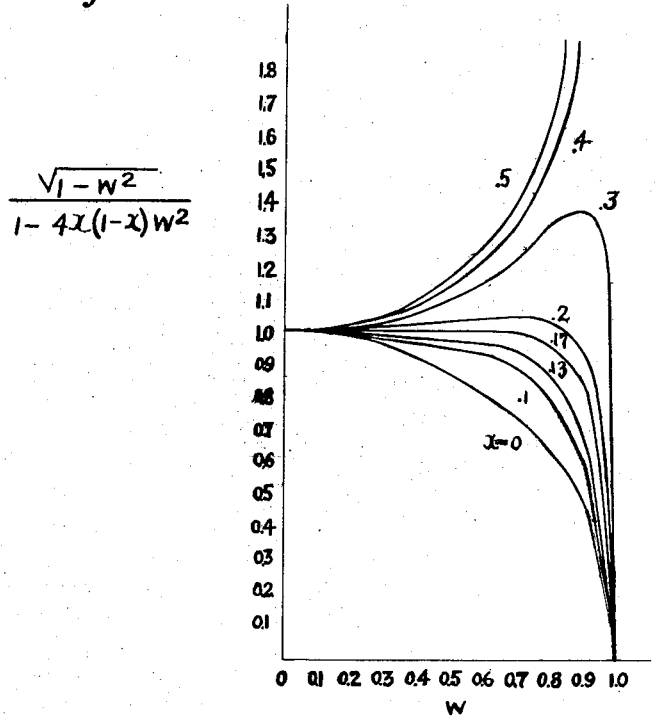

In the accompanying drawing, Figure 1 shows diagrammatically the basic form of artificial line arranged in accordance with my invention; Fig. 2 illustrates the extended form of artificial line; Fig. 3 presents a series of curves showing the applicability of the invention; Fig. 4 represents a long loaded line beginning at mid-load; and Fig. 5 represents a similar line beginning at any point in the section.

A general formula for the mid-load impedance of a long periodically loaded transmission line (see equation 19 of G. A. Campbell's paper on "Loaded Lines in Telephonic Transmission", *Philosophical Magazine*, March, 1903) is:

$$K = k\sqrt{\left(1+\tfrac{Hd}{2k}\tan\tfrac{h\gamma d}{2}\right)\left(1+\tfrac{Hd}{2k}\cot\tfrac{h\gamma d}{2}\right)}$$

In the above equation, K denotes the mid-load impedance, that is, the impedance of a long loaded line which begins with a load whose impedance is equal to one-half the impedance of a normal or full load; $k$ denotes the impedance of the line if it were not loaded; $d$ denotes the load-spacing, that is, the distance between two adjacent loading points; $Hd$ denotes the impedance of each load, H being therefore the load-impedance per unit length of line; and $\gamma$ denotes the propagation-coefficient per unit length of the line if it were not loaded.

This equation, when represented graphically by plotted curves, shows that over the commercially employed range of values of the line constants (inductance, capacity, resistance, conductance leakage, and load-spacing) the mid-load impedance of a long periodically loaded transmission line such as indicated in Fig. 4 is to a good approximation the same as the impedance would be if there were no conductance leakage across the circuit, no resistance in the wires or coils and no distributed inductance, but with the same total inductance and total capacity per periodic interval; this approximation being good over the frequency range extending approximately from $w=0.10$ to $w=0.95$ or even higher. Here, as in Mr. Campbell's paper, $$w = \tfrac{1}{2}p\sqrt{LC}$$

where L and C here denote respectively the total inductance and total capacity per periodic interval of the loaded line, $p/2\pi$ denotes the frequency, and the English letter $w$ is here used in place of the Greek letter $\omega$ employed in Mr. Campbell's paper. The term "periodic interval" here denotes the portion of the loaded line extending from any point in one section to the corresponding point in the next section; or from a point in one load to the corresponding point in the next load; a section being the non-loaded portion of line between loads, and the "first section" being the portion of line preceding the first load. The terms "section" and "loading section" are here used synonymously.

That value of the frequency $p/2\pi$ at which $w=1$ is called the critical frequency of the loaded transmission line, because at that point a sudden change occurs in the line characteristics (both impedance and propagation constant) and in its immediate neighborhood the line characteristics vary rapidly with the frequency.

The critical frequency being that value of the frequency at which $w=1$, it follows that $w$ is equal to the ratio of the frequency to the critical frequency. This concept of $w$ is particularly useful owing to the fact that efficient transmission is inherently limited to the frequency range extending from $w=0$ to a value of $w$ slightly less than unity, the transmission efficiency being very low (approximately to zero) for larger values of $w$.

The above simplifying considerations when applied to Mr. Campbell's equation show that the mid-load impedance of a long periodically loaded line is to a close approximation equal to $$\sqrt{(1-w^2)L/C}.$$

A corresponding approximation for the impedance $Z$ of a long periodically loaded line which begins at any point in a section, as indicated in Fig. 5, is obtainable from the above by considering the line originally beginning at mid-load, as indicated in Fig. 4, to be built back to the initial position in question by the addition of the remaining half-load having an inductance equal half the inductance of a full load, together with the requisite bridged capacity $xC$ corresponding to the fractional length of the first section, the fractional length of the first section being the ratio of the length of the first section to the length of a normal or full section. The approximate formula for $Z$ is thus $$Z = \sqrt{\frac{(1-w^2)L/C}{1-4x(1-x)w^2}} + i\frac{(\tfrac{1}{2}-x)pL}{1-4x(1-x)w^2}$$

be expressed—

$$Z = \sqrt{\frac{(1-w^2)L/C}{1-4x(1-x)w^2}} + i\frac{(1-2x)w\sqrt{L/C}}{1-4x(1-x)w^2}$$

where $i = \sqrt{-1}$, and $x$ denotes the fractional length of the first section, so that $x$ represents the ratio of the capacity of the first section to the capacity of a full section.

The expression for the reactance component of $Z$ may be written in the form $pL_0/(1-p^2L_0C_0)$ where $L_0 = L(\tfrac{1}{2}-x)$ and $C_0 = Cx(1-x)/(\tfrac{1}{2}-x)$. Thus the reactance is the same as the reactance of the simple combination consisting of a fixed inductance $L_0$ in parallel with a fixed capacity $C_0$ proportioned as just shown; and hence the reactance may be simulated by such combination. Of course physical limitations restrict the choice of $x$ to those values for which $L_0$ and $C_0$ are positive, but that means only that $x$ cannot exceed $\tfrac{1}{2}$, while it may have any value from 0 to $\tfrac{1}{2}$.

A plot of the coefficient of $\sqrt{L/C}$ in the resistance component of $Z$ herewith (Fig. 3) shows this resistance component to be nearly constant and equal to $\sqrt{L/C}$ over the frequency range extending from $w=0$ nearly up to the critical frequency, at which $w=1$, if $x$ is approximately equal to 0.2.

Hence the resistance component of a loaded line beginning at about 0.2-section, that is, beginning where $x$, the ratio of the length of the first section to the length of a normal section, is equal to 0.2, may be closely simulated by a constant resistance $R_0 = \sqrt{L/C}$ (over the frequency range included between $w=0.10$ and $w=0.85$, about). Although the reactance component may be simulated by an inductance $L_0$ in parallel with a capacity $C_0$ as above described, for any value of $x$ lying between 0 and $\tfrac{1}{2}$, simulation of the resistance component by a fixed resistance is (as shown by Fig. 3) only possible over a small range of $x$ in the neighborhood of $x=0.2$, except by a considerable restriction of the frequency range of simulation. If $x=0.2$, the resistance component is constant to within about $\pm 5\%$ over the wide frequency range included between $w=0.10$ and $w=0.85$, about. If the requirements of any particular case do not necessitate simulation of the resistance component over such a wide frequency range, the simulation can be made still closer over any desired smaller portion of that frequency range by choosing the length of the first section at a value slightly different from 0.2; the most suitable value for any particular case being determined from inspection of the set of curves (Fig. 3) representing the value of the coefficient of $\sqrt{L/C}$, in the expression for the resistance component of $Z$, plotted with $w$ as independent variable and $x$ as parameter. This set of curves shows that $x$ would rarely be chosen smaller than 0.17 or larger than 0.20.

The preceding results are summarized in the following practical rule for proportioning the organization which constitutes my invention: The impedance of a long periodically loaded transmission line, beginning at the fractional part, 0.17 to 0.20-section, may be closely simulated over most of the frequency range below the critical frequency by the simple three-branch network, as illustrated in Fig. 1, consisting of a constant resistance $R_0$ in series with the combination consisting of a capacity $C_0$ in parallel with a high time-constant inductance $L_0$, which are proportioned as follows:

| General case, $x=x$. | | Special case, $x=0.2$. |
|---|---|---|
| $R_0 = \sqrt{\dfrac{L}{C}}$ | $=$ | $\sqrt{\dfrac{L}{C}}$ |
| $L_0 = (\tfrac{1}{2}-x)L$ | $=$ | $\dfrac{3}{10}L$ |
| $C_0 = \dfrac{x(1-x)}{\tfrac{1}{2}-x}C$ | $=$ | $\dfrac{8}{15}C$ |

The special case $x=0.2$ is perhaps the most generally useful one of the possible range extending approximately from $x=0.17$ to $x=0.20$.

If the loaded line whose impedance is to be simulated does not happen to begin at about 0.2-section, where its resistance is nearly constant, the simulation may be accomplished by the slight extension hereinbefore mentioned, which consists in extending the network to that position at which the loaded line begins; or in extending the loaded line itself in case such extension is permissible, or in extending each to any desired position. The excess may be simulated as closely as desired by subdividing it into sufficiently small portions whose distributed elements (resistance, inductance, capacity) may then be replaced by their collected values. The excess need never consist of more than one periodic interval and in such case may usually be represented sufficiently well for the purpose of impedance simulation by a network of not more than three branches, a greater number of branches adding only slightly to the precision.

This invention finds its application where the impedance of a loaded line is to be simulated; as for example, for balancing purposes, as in systems involving two two-way telephone repeaters and in other transmission lines.

Suppose, for example, it is desired to proportion a network to simulate or balance the impedance of a long periodically loaded transmission line constituted as follows: An aerial circuit consisting of two parallel wires of No. 8 B. W. G. copper wire, loaded at intervals of 8 miles and beginning at 0.7-section (so that the length of the first section is 5.6 miles). Inductance per load= 0.240 henry. Distributed inductance per 8-mile section=0.027 henry. Distributed capacity per 8-mile section=$0.074 \times 10^{-6}$ farad. Here, then $L=0.240+0.027=0.267$ henry; and $C=0.074 \times 10^{-6}$ farad.

The three-branch network $R_o$, $L_o$, $C_o$ is next to be proportioned in accordance with the general rule given above, with due regard to the frequency range of simulation required. In the case of this illustrative example it will be assumed that the impedance simulation should extend over as wide a range as is consistent with a requisite precision of about $\pm 5\%$. Hence $x$ is chosen at a value of 0.20. Then $$R_o = \sqrt{\frac{L}{C}} = \sqrt{\frac{0.267}{0.074 \times 10^{-6}}} = 1900 \text{ ohms}$$

$$L_o = \frac{3}{10} L = \frac{3}{10} \times 0.267 = 0.070 \text{ henry}$$

$$C_o = \frac{8}{15} C = \frac{8}{15} \times 0.074 \times 10^{-6} = 0.0395 \times 10^{-6} \text{ farad.}$$

Having thus proportioned a network to simulate the loaded line impedance at 0.2-section the next step is merely that of proportioning a supplementary excess network for extending the 0.2-section network to 0.7-section position, which is the position at which the loaded line under consideration actually begins. The requisite excess-network is therefore such as will simulate 0.5 of a section (that is 0.7-0.2=0.5). For most purposes this simulation would be accomplished with sufficient accuracy by a capacity $C_1$ (Fig. 2) ($0.037 \times 10^{-6}$ farad) equal to the collected capacity of the excess 0.5-section, the distributed inductance and resistance of the 0.5-section being ignored. A somewhat higher degree of accuracy could be obtained by employing a symmetrical T-network, which adds to the capacity $C_1$ equal resistances $R_1$, $R_2$, each equivalent to one half the resistance of the excess 0.5-section.

I claim:

1. An artificial line simulating the impedance of an actual loaded line beginning at any point in a periodic interval of the loaded line and comprising precomputed resistance and reactance components dependent upon the length of a loading section of the actual line.

2. An artificial line simulating the impedance of an actual loaded line beginning at any point in a periodic interval of the loaded line and comprising resistance, inductance and capacity of precomputed values dependent upon the length of a loading section of the actual line.

3. An artificial line simulating the impedance of an actual line loaded at periodic intervals, said artificial line comprising an impedance of precomputed value which is a function of the inductance and capacity of a periodic interval of the actual line.

4. An artificial line simulating the impedance of an actual line loaded at periodic intervals, said artificial line comprising an impedance of precomputed value which is a function of the inductance and capacity of a periodic interval of the actual line and of the length of a loading section of the actual line.

5. An artificial line simulating the impedance of an actual line loaded at periodic intervals, said artificial line comprising an inductance and a capacity of precomputed values which are functions of the inductance and capacity of a periodic interval of the actual line and of the length of a section of the actual line between an end and the first loading point.

6. An artificial line simulating the impedance of an actual line loaded at periodic intervals, said artificial line comprising an inductance, a capacity and a resistance of precomputed values, the inductance and capacity being respectively a function of the inductance and capacity of a periodic interval of the actual line, and the resistance being a function of both the capacity and inductance of a periodic interval of the actual line.

7. An artificial line simulating the impedance of an actual line loaded at periodic intervals, said artificial line comprising an inductance and a capacity of precomputed values which each bear a definite relation to the respective total inductance and capacity of a periodic interval of the actual line and their magnitude being dependent upon the length of that section of the actual line between the initial end and the first loading point.

8. An artificial line simulating the impedance of an actual line loaded at periodic intervals, said artificial line comprising an inductance, a capacity and a resistance of precomputed values, the inductance and capacity bearing a definite relation to the respective total inductance and capacity of a periodic interval of the actual line and their magnitude being dependent upon the length of that section of the actual line between the initial end and the first loading point, and the resistance being determined by the inductance and capacity of the periodic interval.

9. An artificial line simulating the impedance of an actual line loaded at periodic intervals, said artificial line comprising an inductance and capacity of precomputed values connected in parallel and being respectively functions of the inductance and capacity of a periodic interval of the artificial line, and a resistance in series with the inductance and capacity, said resistance being a function of both the inductance and capacity of the periodic interval of the actual line.

10. An artificial line simulating the impedance of an actual line loaded at periodic intervals, said artificial line comprising an inductance and a capacity of precomputed values connected in parallel and each bearing a definite relation to the respective total inductance and capacity of a periodic interval of the actual line and their magnitude being dependent upon the length of that section of the actual line between the initial end and the first loading point, and a resistance in series with the inductance and capacity, said resistance being determined by the inductance and capacity of the periodic interval of the actual line.

11. An artificial line simulating the impedance of an actual line loaded at periodic intervals, said artificial line comprising a portion the electrical constants of which depend upon the electrical constants of a periodic interval of the actual line and upon a predetermined fraction of the length of said periodic interval, and a portion the electrical constants of which depend upon those of the periodic interval of the actual line and upon the difference between the fractional length of said periodic interval and the length of an end section of the actual line.

12. An artificial line consisting of a portion comprising an inductance and a capacity in parallel and a resistance in series with said inductance and capacity, and a portion comprising a capacity in parallel with the first-named portion and a resistance in series with the resistance of the first-named portion and symmetrically distributed with respect to the capacity of the second portion.

13. An artificial line simulating the reactance of an actual line loaded at periodic intervals and beginning at any point in a section, said artificial line comprising inductance and capacity of precomputed values dependent on the fractional length of the initial section of said loaded line.

14. An artificial line substantially equivalent in impedance to an actual line loaded at periodic intervals and comprising inductance, capacity, and resistance of precomputed values dependent on the electrical constants per unit length of said loaded line.

15. An artificial line substantially equivalent in electrical circuit properties to an actual loaded line and characterized by having electrical dimensions of precomputed values dependent on the length of a loading section of the actual line.

In testimony whereof, I have signed my name to this specification in the presence of two subscribing witnesses, this 23rd day of April, 1913.

RAY S. HOYT.

Witnesses:
G. RAUMSON,
F. H. GIESECKE.